United States Patent
Provost

(10) Patent No.: US 8,641,370 B2
(45) Date of Patent: Feb. 4, 2014

(54) LOCKING DEVICE COMPRISING A TELESCOPIC CONNECTING ROD EQUIPPED WITH RETURN MEANS

(75) Inventor: Fabrice Provost, Notre-Dame-du-Bec (FR)

(73) Assignee: Aircelle, Gonfreville l'Orcher (FR)

( * ) Notice: Subject to any disclaimer, the term of this patent is extended or adjusted under 35 U.S.C. 154(b) by 616 days.

(21) Appl. No.: 12/673,912

(22) PCT Filed: Aug. 12, 2008

(86) PCT No.: PCT/EP2008/060586
§ 371 (c)(1),
(2), (4) Date: Mar. 29, 2011

(87) PCT Pub. No.: WO2009/043635
PCT Pub. Date: Apr. 9, 2009

(65) Prior Publication Data
US 2011/0171019 A1    Jul. 14, 2011

(30) Foreign Application Priority Data
Aug. 20, 2007    (FR) ...................... 07 05938

(51) Int. Cl.
*F01D 25/24* (2006.01)
(52) U.S. Cl.
USPC ...................... 415/127; 415/214.1
(58) Field of Classification Search
USPC ........... 415/214.1, 213.1, 128, 127, 126, 119; 416/244 R, 244 A, 246, 31; 244/129.4, 244/129.5, 53 R, 54
See application file for complete search history.

(56) References Cited

U.S. PATENT DOCUMENTS

| | | | | |
|---|---|---|---|---|
| 3,194,595 A | * | 7/1965 | Wheeler et al. | 292/113 |
| 4,549,708 A | * | 10/1985 | Norris | 244/129.4 |
| 5,076,514 A | * | 12/1991 | Melcher | 244/129.4 |
| 5,704,569 A | * | 1/1998 | Daniels | 244/129.5 |
| 5,984,382 A | | 11/1999 | Bourne et al. | |

FOREIGN PATENT DOCUMENTS

| | | | |
|---|---|---|---|
| DE | 3045865 | | 7/1982 |
| DE | 9016416 | | 2/1991 |
| DE | 9016416.4 | * | 2/1991 |
| EP | 1197619 | | 4/2002 |
| FR | 1485188 | | 9/1967 |

OTHER PUBLICATIONS

International Search Report; PCT/EP2008/060586; Nov. 25, 2008.

* cited by examiner

*Primary Examiner* — Edward Look
*Assistant Examiner* — William Grigos
(74) *Attorney, Agent, or Firm* — Brinks Gilson & Lione

(57) ABSTRACT

The present invention relates to a locking device (10) designed to fixedly attach a first element (9a) to a second element, comprising a locking member (12) intended to equip the first element, an additional locking element intended to equip the second element, and a control handle (13) connected to the locking member via transmission means, characterized in that the transmission means comprise a telescopic connecting rod (15) designed to oscillate freely between a minimum extension position and a maximum extension position, and means for returning the telescopic connecting rod to its position of maximum extension, said return means being placed in a prestressed state when the control handle is in the closure position.

10 Claims, 4 Drawing Sheets

LOCKING DEVICE COMPRISING A TELESCOPIC CONNECTING ROD EQUIPPED WITH RETURN MEANS

TECHNICAL FIELD

The present invention relates to a locking device designed for fixedly attaching a first element to a second element and, more particularly, to a turbojet engine nacelle equipped with at least one such locking device.

BACKGROUND

In order to lock two elements to one another, it has been known for a very long time to install a locking member in the first element and a complementary locking member in the second element and to control the attachment or detachment of these by means of a control handle connected to the locking member by transmission means, for example of the cable or rigid bar type.

Within the specific scope of a turbojet engine nacelle comprising a front air inlet section, a middle section intended for surrounding a blower of the turbojet engine, and a rear section formed from at least two half-shells, these are conventionally held in the closing position by means of such locking devices arranged along a junction line located in the lower part (at 6 o'clock).

For each of them, the control handle is designed so as to be capable of being displaced alternately from an opening position, in which the locking member is open, to a closing position, in which the locking member is closed, passing through an intermediate phase where the locking member is closed.

Nevertheless, such a locking device is rigid and is therefore not compliant with the relative displacements between the locking member and the control handle. The result of these displacements may be premature unlocking or, to a lesser extent, too high a mechanical stress upon the transmission means, thus leading to premature wear of the equipment.

Moreover, this gives rise to a constraint whereby the setting of the transmission means has to be carried out with high precision by the operators in order to make it possible for the locking device to function optimally.

BRIEF SUMMARY

The disclosure seeks to overcome the abovementioned disadvantages completely or partially and, for this purpose, the invention comprises a locking device designed for fixedly attaching a first element to a second element, said locking device comprising a complementary locking member intended for equipping the second element, and a control handle connected to the locking member by transmission means, characterized in that the transmission means comprise, on the one hand, a telescopic connecting rod designed to oscillate freely between a position of minimum extension and a position of maximum extension and, on the other hand, means for the return of the telescopic connecting rod toward its position of maximum extension, said return means being placed in a prestressed state when the control handle is in the closing position.

Thus, using a telescopic connecting rod combined with return means makes it possible to become compliant with regard to relative displacements between the locking member and the control handle. To be precise, the deflection allowed by the telescopic connecting rod makes it possible to compensate these relative displacements, and the return means ensure that the locking member is held permanently in the locked position on the complementary locking member during these relative displacements. Locking is therefore effective and secured, and the telescopic connecting rod is subjected to only very low mechanical stress.

Moreover, the operators are no longer forced to carry out an extremely precise setting of the transmission means on account of the deflection allowed by the telescopic connecting rod. This therefore affords a considerable advantage, as compared with the conventional locking devices which prevent any approximation because of their rigidity.

Furthermore, such a locking device allows setting upon the opening of the control handle when only the locking force is involved.

Preferably, the telescopic connecting rod comprises a first rod fitted into a second rod.

Also preferably, the return means includes at least one spring integrated in the telescopic connecting rod.

According to a preferred embodiment of the invention, the spring has a first end fastened in the end of the first rod fitted in the second rod, and a second end fastened in the second rod.

Advantageously, a pin fastened transversely in the second rod passes through two slots formed in the lateral surface of the first rod.

Also advantageously, the control handle is designed so as to be capable of being displaced alternately from a stable opening position, in which the locking member is open, to a stable locking position, in which the locking member is closed, passing through an unstable intermediate phase where the locking member is closed.

According to a preferred alternative embodiment of the invention, the return member is designed so as to be capable, during the intermediate phase, of returning the control handle in the direction of its opening position if said control handle is freed of any external stress.

Another advantage is therefore that, if the stresses exerted on the control handle for the purpose of closing it cease before the latter reaches its closed and secure position, the stressing member tends to return it into its opening position. Consequently, it is easier to detect the improper closing of the locking device visually.

The present invention also relates to a turbojet engine nacelle comprising a front air inlet section, a middle section intended for surrounding a blower of the turbojet engine, and a rear section formed from at least two half-shells held in the closing position by means of locking assemblies arranged along a junction line located in the lower part, characterized in that at least one of these locking assemblies comprises a locking device according to the invention.

A very important advantage, then, is that the return of the control handle toward its opening position by virtue of the return member in the event of a cessation of the closing stresses during the intermediate phase thereby makes it possible to prevent the closing and locking of the fan cowl arranged around it.

Preferably, the locking device according to the invention is arranged at least in front of the junction line.

Finally, the present invention relates to an aircraft comprising at least one nacelle according to the invention.

BRIEF DESCRIPTION OF THE DRAWINGS

The implementation of the invention will be understood more clearly from the detailed description which is given below with reference to the accompanying drawing in which.

DETAILED DESCRIPTION

Figure 1:
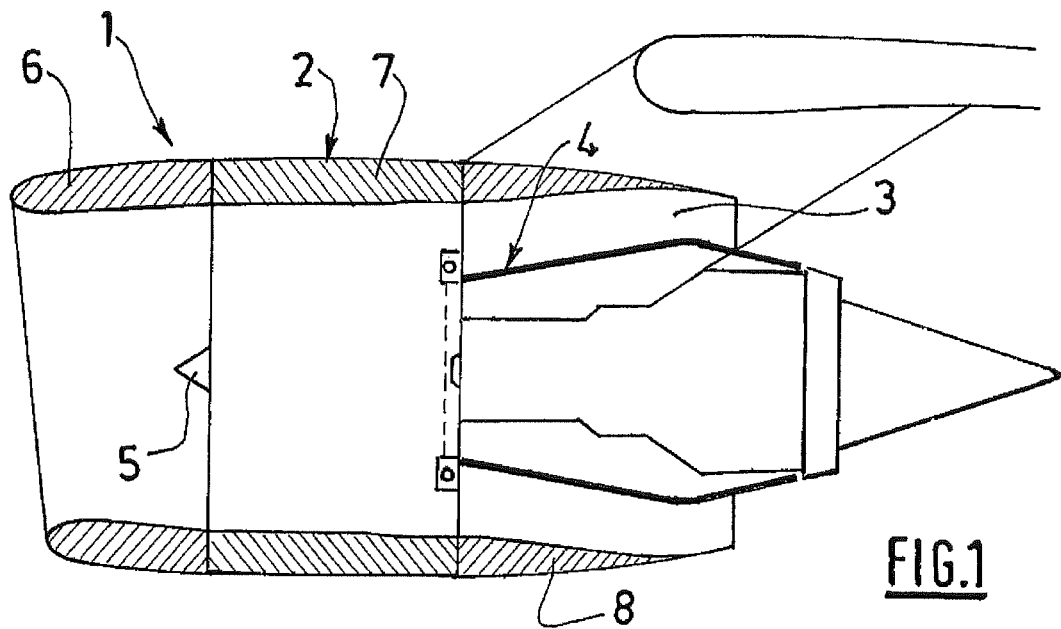
FIG. 1 is a diagrammatic view in longitudinal section of a nacelle according to the invention in the closing state.

An aircraft nacelle 1 according to the invention, as illustrated in FIG. 1, comprises in a way known per se an external structure 2, called an OFS, which defines an annular flow channel 3 with a concentric internal structure 4 surrounding the actual structure of the turbojet engine (not illustrated) at the rear of a blower 5.

More specifically, this external structure 2 is broken down into a front air inlet section 6, a middle section 7 intended for surrounding the blower 5, and a rear section 8 formed from at least two half-shells 9a, 9b.

In the operating position, the two half-shells 9a, 9b are positioned nearest to the turbojet engine and are conventionally held in this position with the aid of a plurality of locking devices provided along a junction line located in the lower part (at 6 o'clock).

Figure 2:
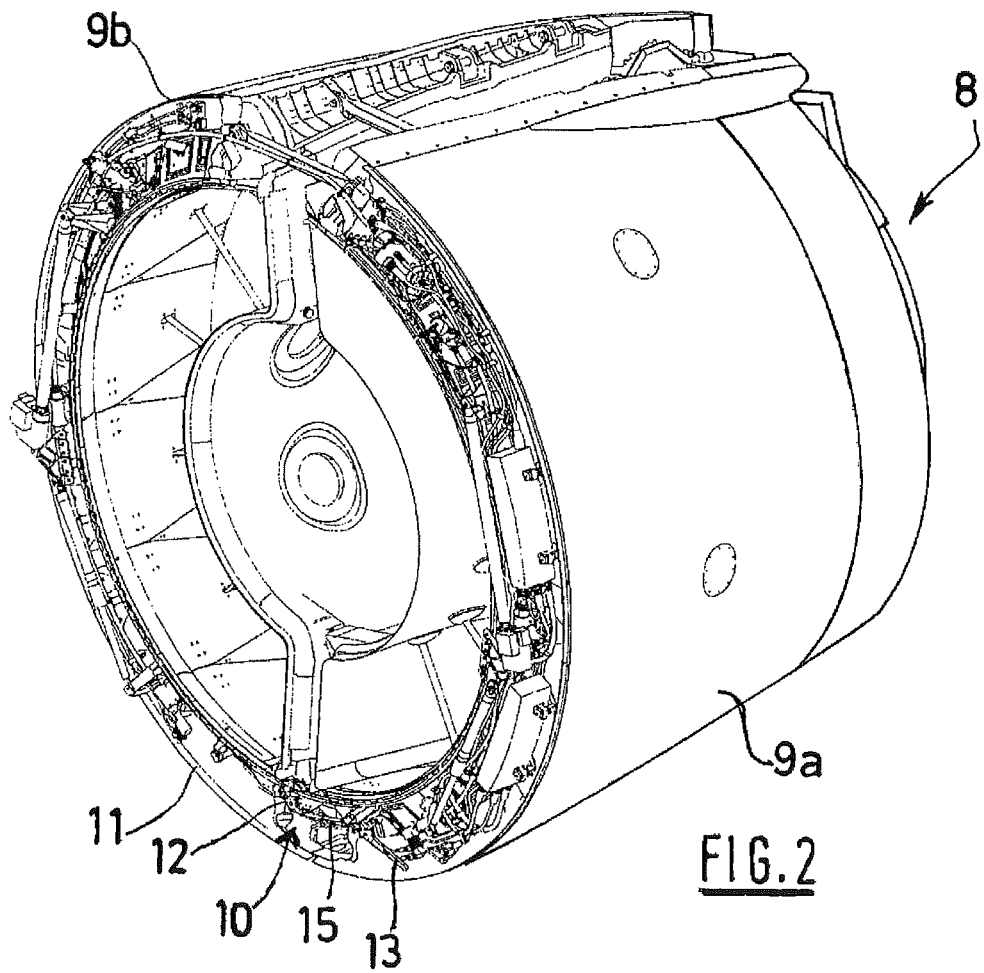
FIG. 2 is a perspective view of the rear section of the nacelle illustrated in FIG. 1.
Figure 3:
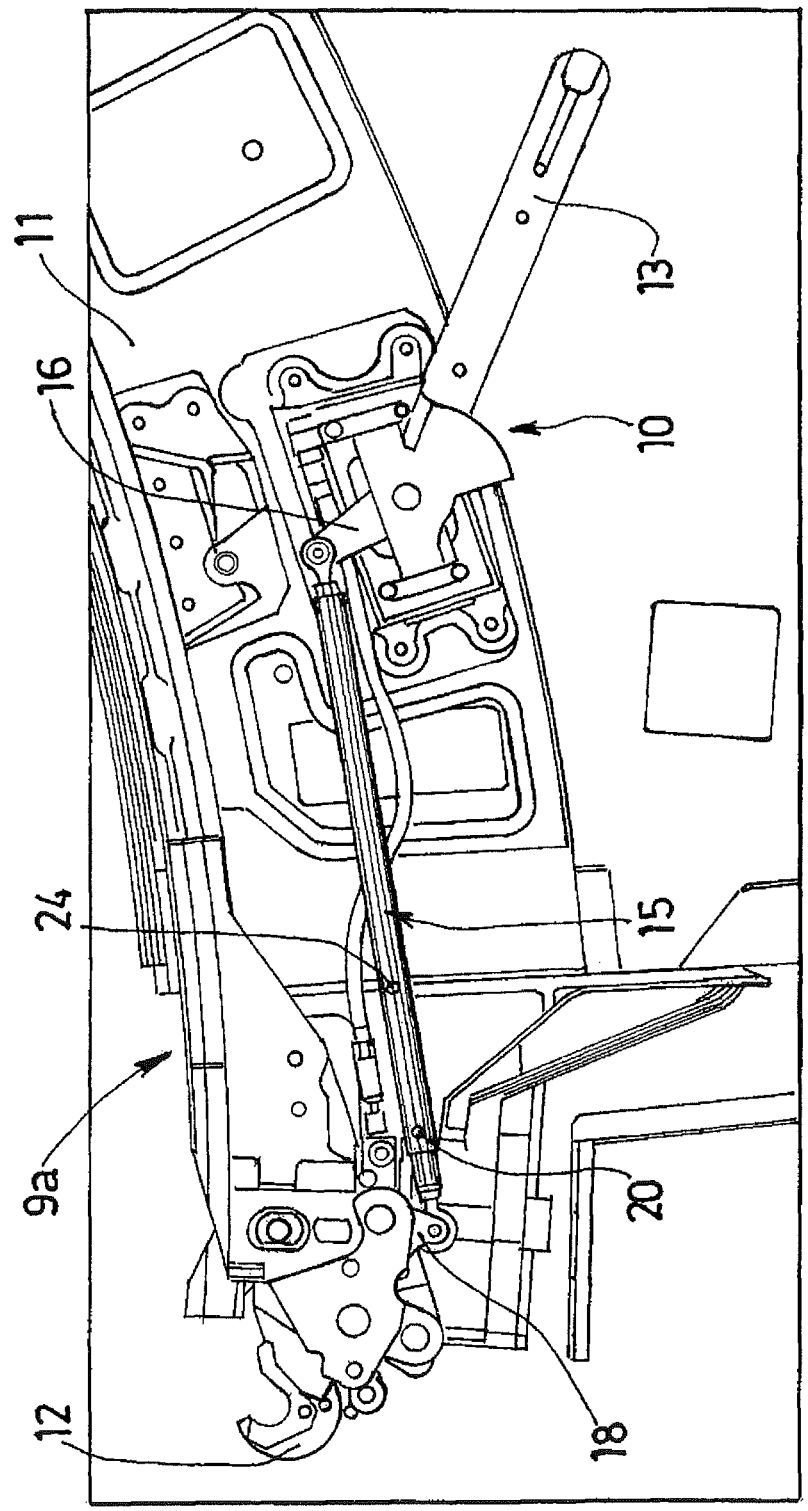
FIG. 3 is an enlarged partial view of the locking device equipping the nacelle illustrated in FIG. 2.

As illustrated in FIG. 2, a locking device 10 according to the invention may, in particular, be integrated in the front part of the rear section 8, and more especially in the region of a front frame 11, the latter being the element making it possible to attach the rear section 8 to a fixed part of the middle section 7.

The locking device 10, as illustrated in FIGS. 3 to 7, comprises diagrammatically a locking member 12 equipping one of the two half-shells 9a, and a complementary locking member (not illustrated) equipping the other half-shell 9b.

Conventionally, this locking device 10 comprises an offset control handle 13 connected to the locking member 12 by transmission means comprising a connecting rod 15 having, on the one hand, a first end attached to a link 16, the rotation of which is actuated as a result of the pivoting of the control handle 13, and, on the other hand, a second end attached indirectly to said locking member 12.

The locking member 12 comprises a hook, the pivoting of which is conventionally subject to the movement of the control handle 13 by means of a set of links 18 connecting the second end of the rod 15 to said hook 12.

The complementary locking member will be implemented in the form of a longitudinal pin, around which the hook 12 will be able to be hooked or, on the contrary, to move away, depending on whether the control handle 13 will be actuated for the purpose of closing or opening the locking device 10.

According to the invention, the connecting rod 15 is a telescopic connecting rod which is broken down into a first rod 15a fitted into a second hollow rod 15b.

The fitted part of the first rod 15a has a lateral surface equipped with two diametrically opposite longitudinal slots 19. A transverse pin 20 fastened in two diametrically opposite orifices of the second rod 15b passes through the two slots 19 of the first rod 15a. Consequently, the length of these two slots 19 defines the maximum amplitude of oscillation of the telescopic connecting rod 15.

Return means implemented in the form of a spring 21 are integrated in the telescopic connecting rod 15. More specifically, this spring 21 comprises a first end 22 fastened in the end of the first rod 15a fitted in the second rod 15b, and a second end 23 attached to the second rod 15b by means of a transverse stud 24 fastened in two bores located in the lateral surface of said second rod 15b.

Figure 4:
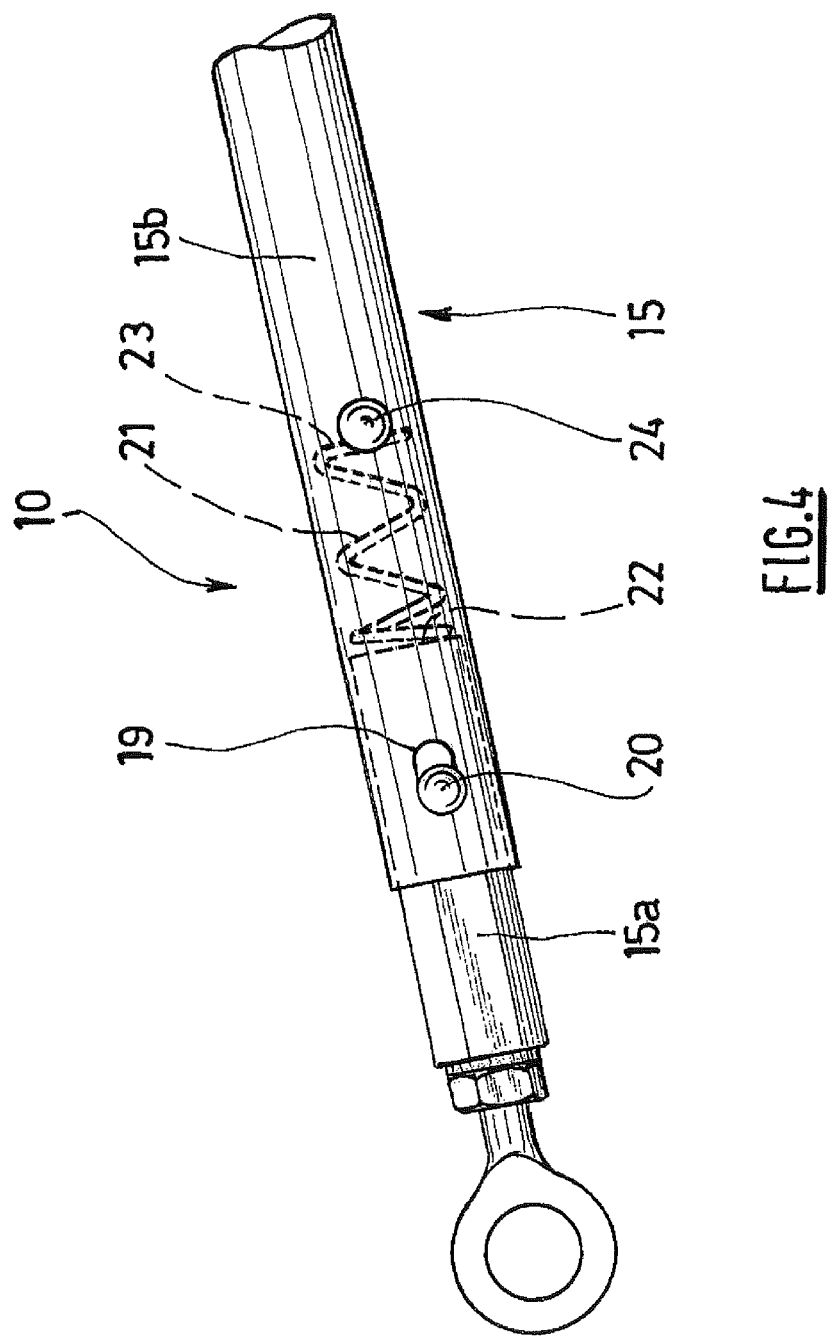
FIG. 4 is a view, in the form of a detail, of the telescopic connecting rod of the locking device illustrated in FIG. 3, in the position of minimum extension.
Figure 5:
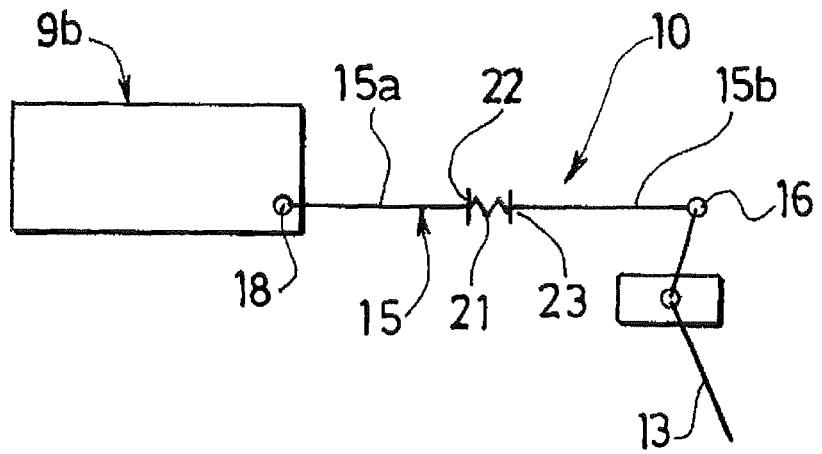
FIGS. 5 to 7 are diagrammatic views of the locking device, in which the control handle is respectively in the opening position, in the intermediate position and in the closing position.
Figure 6:
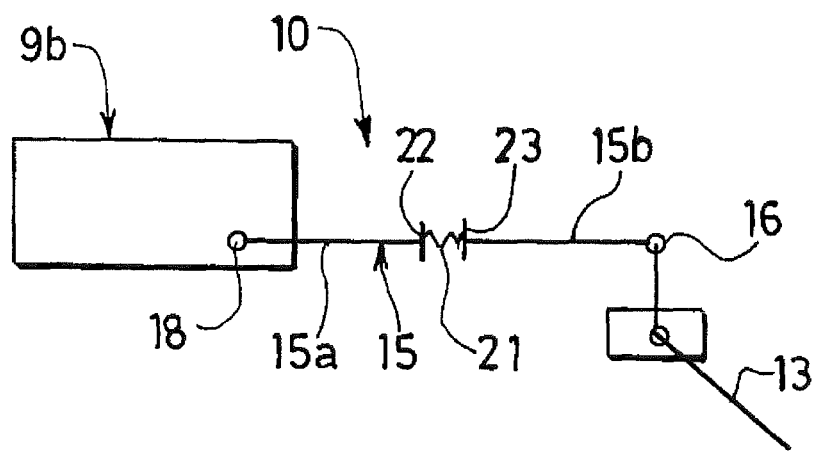
Figure 7:
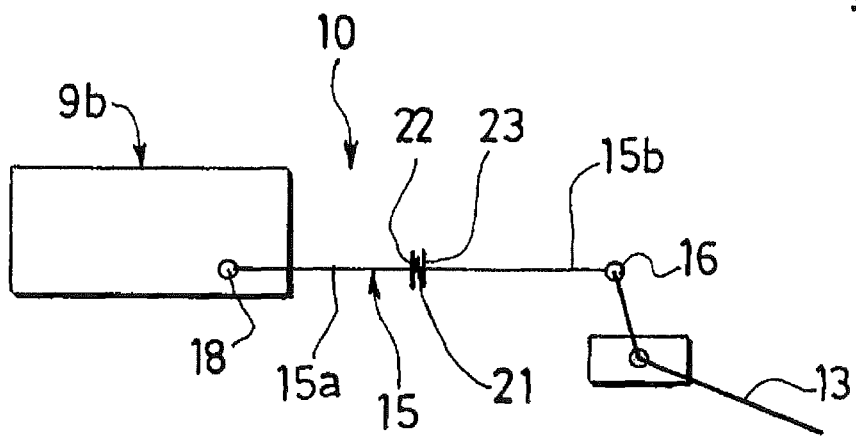

At rest, this spring 21 is always under compression and tends to move the rods 15a, 15b away from one another, but, in the absence of deformation of the front frame 11, the connecting rod 15 is in the position of minimum extension, this being reflected in the fact that the pin 20 is at the bottom of the slot 19, as shown in FIG. 4.

According to the invention, the control handle 13 is designed so as to be capable of being displaced alternately from a stable opening position, in which the hook 12 is open, to a stable locking position, in which the hook 12 is closed, passing through an unstable intermediate phase where the hook 12 is closed.

More specifically, when the control handle 13 is in the stable opening position, the spring 21 is relaxed and the hook 12 is separated from the complementary locking member.

The spring 21 is designed in such a way that it is capable, if the control handle is released by the operator before the latter has placed it in the closing position, of returning, by being relaxed, said control handle 13 into a quasi-opening position, in which it projects, thus, on the one hand, making it clearly identifiable by the operator and, on the other hand, enabling him to prevent the closing of the fan cowl arranged around it.

Insofar as the control handle 13 has not reached its closing position, this return will occur even if the control handle 13 has pivoted sufficiently to force the first rod 15a and the second rod 15b to experience translational motion until the hook 12 comes into engagement with the complementary locking member. Any risk of error is therefore avoided during the intermediate phase.

Once the control handle 13 is in the stable closing position, the spring 21 will consequently be in a prestressed state. Thus, using a telescopic connecting rod 15 combined with such a spring 21 makes it possible to be compliant with regard to relative displacements between the hook 12 and the control handle 13. To be precise, the deflection allowed by the telescopic connecting rod 15 makes it possible to compensate these relative displacements, and the spring ensures that the hook 12 is held permanently in the locked position on the complementary locking member during these relative displacements. Locking is therefore effective and secured, and the telescopic connecting rod 15 is subjected to only very low mechanical stress.

Moreover, the operator is no longer forced to carry out an extremely precise setting of the transmission means on account of the deflection allowed by the telescopic connecting rod 15. This therefore affords a considerable advantage, as compared with the conventional locking devices which prevent any approximation because of their rigidity.

Furthermore, such a locking device 10 allows setting upon the opening of the control handle 13 where only the locking force is involved.

Although the invention has been described in connection with particular exemplary embodiments, it is quite clear that it is in no way limited to these and that it comprises all the technical equivalents of the means described and also their combinations if these come within the scope of the invention.

The invention claimed is:

1. A locking device designed for fixedly attaching a first element to a second element, said locking device comprising:
    a locking member intended for equipping the first element, a complementary locking member intended for equipping the second element, and a control handle connected to the locking member by transmission means, characterized in that wherein the transmission means comprise a telescopic connecting rod designed to oscillate freely between a position of minimum extension and a position of maximum extension and, on the-other-hand, means for the return of the telescopic connecting rod toward a position of maximum extension, said return means being placed in a prestressed state when the control handle is in the closing position.

2. The locking device as claimed in claim 1, wherein the telescopic connecting rod comprises a first rod fitted into a second rod.

3. The locking device as claimed in claim 2, wherein the return means comprise at least one spring integrated in the telescopic connecting rod.

4. The locking device as claimed in claim 3, thatwherein the spring has a first end fastened in an end of the first rod fitted in the second rod, and a second end fastened in the second rod.

5. The locking device as claimed in claim 2, wherein a pin fastened transversely in the second rod passes through two slots formed in a lateral surface of the first rod.

6. The locking device as claimed in claim 1, wherein the control handle is designed so as to be capable of being displaced alternately from a stable opening position, in which the locking member is open, to a stable locking position, in which the locking member is closed, passing through an unstable intermediate phase where the locking member is closed.

7. The locking device as claimed in claim 6, wherein the return member is designed so as to be capable, during the intermediate phase, of returning the control handle in the direction of its opening position if said control handle is freed of any external stress.

8. A turbojet engine nacelle comprising:

a front air inlet section, a middle section intended for surrounding a blower of the turbojet engine, and a rear section formed from at least two half-shells held in a closing position by means of locking assemblies arranged along a junction line located in the lower part, wherein at least one of these locking assemblies comprises a locking device as claimed in claim 1.

9. The turbojet engine nacelle (1) as claimed in claim 8, wherein at least the locking device is arranged in front of the junction line.

10. An aircraft, comprising at least one nacelle as claimed in claim 8.

* * * * *

UNITED STATES PATENT AND TRADEMARK OFFICE
CERTIFICATE OF CORRECTION

PATENT NO.       : 8,641,370 B2                                      Page 1 of 1
APPLICATION NO. : 12/673912
DATED            : February 4, 2014
INVENTOR(S)      : Fabrice Provost It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1020 days.

Signed and Sealed this
Twenty-second Day of September, 2015

Michelle K. Lee
*Director of the United States Patent and Trademark Office*